United States Patent
Royo Bonnin et al.

(10) Patent No.: US 12,223,403 B2
(45) Date of Patent: *Feb. 11, 2025

(54) MACHINE LEARNING MODEL PUBLISHING SYSTEMS AND METHODS

(71) Applicant: OPEN TEXT SA ULC, Halifax (CA)

(72) Inventors: Isidre Royo Bonnin, Terrassa (ES); Mariano Fernandez Garrido, Seville (ES)

(73) Assignee: OPEN TEXT SA ULC, Halifax (CA)

( * ) Notice: Subject to any disclaimer, the term of this patent is extended or adjusted under 35 U.S.C. 154(b) by 53 days.

This patent is subject to a terminal disclaimer.

(21) Appl. No.: 17/977,839

(22) Filed: Oct. 31, 2022

(65) Prior Publication Data

US 2023/0072862 A1  Mar. 9, 2023

Related U.S. Application Data

(63) Continuation of application No. 16/262,170, filed on Jan. 30, 2019, now Pat. No. 11,514,356.

(51) Int. Cl.
*G06N 20/00* (2019.01)
*G06F 16/182* (2019.01)

(52) U.S. Cl.
CPC .......... *G06N 20/00* (2019.01); *G06F 16/182* (2019.01)

(58) Field of Classification Search
CPC . G06N 20/00; G06N 5/04; G06N 7/01; G06F 16/182
See application file for complete search history.

(56) References Cited

U.S. PATENT DOCUMENTS

| | | | | |
|---|---|---|---|---|
| 10,673,880 | B1* | 6/2020 | Pratt | H04L 63/1433 |
| 11,227,047 | B1* | 1/2022 | Vashisht | G06F 21/56 |
| 11,301,762 | B1* | 4/2022 | Chen | G06F 16/116 |
| 2020/0110619 | A1* | 4/2020 | Rajaram | G06N 20/00 |
| 2020/0175416 | A1* | 6/2020 | Zhao | G06N 20/00 |
| 2021/0397482 | A1* | 12/2021 | Lantz | G06F 9/5038 |

OTHER PUBLICATIONS

Free E-Book from Microsoft: Authore: Jeff Barnes, Title: Microsoft Azure Essentials: Azure Machine learning, Publication date: Apr. 2015 URL: https://social.technet.microsoft.com/wiki/contents/articles/32095.microsoft-azure-essentials-free-e-book-series.aspx#Microsoft_Azure_Essentials_Azure_Machine_Learning.*

* cited by examiner

*Primary Examiner* — Michael A Keller
(74) *Attorney, Agent, or Firm* — Sprinkle IP Law Group (57) ABSTRACT

A machine learning (ML) model publisher can, responsive to an indication that a ML model is ready for publication, generate a publication request form or page on a user device. The ML model publisher can be invoked from within a ML modeling application. Responsive to an instruction received through the publication request form or page, the ML model publisher can access a data structure in memory used in training the ML model and populate the publication request form or page with attributes required by the ML model to run. Responsive to activation of a single-click publication actuator, the ML model publisher can publish the ML model directly from the ML modeling application to a target computing system by providing, to the target computing system, a path to a repository location where the ML model is stored and information on the attributes required by the ML model to run.

20 Claims, 5 Drawing Sheets

```
DESIGNER NOTEBOOK   MY MODEL   Last Checkpoint: 07/03/2018 (autosaved)   [Control Panel] [Logout]

File  Edit  View  Insert  Cell  Kernel  Help   [Kernel starting, please wait...] [Saving every 120s] [Not Trusted]

[💾] [+] [✂] [📋] [📄] [↑] [↓] [▶] [■] [↻]  [Markdown ▼]  [🔗] [Publish to DD]
```

MY MODEL

In [1]:
```
from pyspark.ml.feature import StandardScaler
from pyspark.ml.evaluation import RegressionEvaluator
from pyspark.ml.recommendation import ALS
from pyspark.ml import Pipeline
```

Waiting for a Spark session to start...

In [2]:
```
spark.sq1 ("use demo")
spark.sq1 ("show tables").show()
```

| database | tableName | isTemporary |
|----------|-----------|-------------|
| demo     | ratings   | false       |

...

Prepare training and test datasets and Define Model

In [5]: `training, test = ratings.randomSplit ([0.8, 0.2])`

In [6]: `training.describe('rating').show()`

| summary | rating |
|---------|--------|

...

Build Model
Build the recommendation model using ALS on the training data timestamp from table is not
used by the model. Several ALS parameters have been adjusted in order to improve the model.
Hyperparameters
Alpha=40
Controls the relative weight of observed versus unobserved user-product interactions in the factorization
...

In [ ]:
```
pipeline = Pipeline (stages=[als])
model = pipeline.fit (training)
Predictions = model.transform (test)
```

In [124]: `predictions.show ()`

| ROW_NUM | userid | attid | attribute | timestamp | prediction |
|---------|--------|-------|-----------|-----------|------------|

...

Validate Model
...
Save Model

In [113]: `model.write().overwrite().save ("hdfs://10.250.100.250/models/MyModel")`

MACHINE LEARNING MODEL PUBLISHING SYSTEMS AND METHODS

CROSS-REFERENCE TO RELATED APPLICATIONS

This is a continuation of, and claims a benefit of priority under 35 U.S.C. § 120 from, U.S. Patent Application No. 16/262,170, filed Jan. 30, 2019, issued as U.S. Pat. No. 11,514,356, entitled "MACHINE LEARNING MODEL PUBLISHING SYSTEMS AND METHODS," which is fully incorporated by reference herein for all purposes.

TECHNICAL FIELD

This disclosure relates generally to the field of data processing. More particularly, this disclosure relates to systems, methods, and computer program products for streamlined publication of machine learning models.

BACKGROUND OF THE RELATED ART

Machine learning (ML) is a branch of artificial intelligence (AI) that focuses on the ability of computer systems to learn from data, identify patterns, and make decisions without preprogrammed rules. ML has many practical applications in today's world, for instance, virtual assistant, self-driving cars, stock price prediction, etc.

For a machine to learn how to perform a task, a ML model is needed. Generally, a ML model is built by a human in a development environment and deployed to a production environment after training and testing. AZURE Machine Learning Service, available from Microsoft Corporation, is an example of a cloud-based computing environment that a user can use to develop, train, test, and deploy ML models.

Generally, before a trained ML model can be deployed, the model is packaged into a software package. In the case of a ML model that was trained using the AZURE Machine Learning Service, the model is packaged as a container image. This packaging can be done using a computer program that performs operating-system-level virtualization ("containerization"). The container image includes the dependencies needed to run the model. The packaged model can then be deployed to AZURE-specific web services in the AZURE cloud computing environment.

The packaged model can also be deployed to other target computer systems, either on-premises or in the cloud. However, coding (e.g., in Python, C++, etc.) is required each time the ML model is to be published to a non-AZURE target (e.g., writing code to create an image configuration, writing code to create an image using the image configuration, writing code to define a deployment configuration for deploying, etc.). Manual coding is a time-consuming, tedious, and labor-intensive task and requires in-depth programming knowledge and knowledge of a target system to which the ML model is to be published.

SUMMARY OF THE DISCLOSURE

In this disclosure, the deployment of a developed, trained, and tested ML model to a production environment is referred to as "machine learning model publishing." An object of the invention is to provide an efficient, user-friendly way to publish ML models. In some embodiments, this object can be achieved by a new ML model publisher.

In some embodiments, the ML model publisher can run within a ML modeling application hosted on an AI platform. OpenText™ Magellan, available from Open Text headquartered in Waterloo, Canada, is an example of a flexible AI and analytics platform that combines ML, advanced analytics, and enterprise-grade business intelligence (BI) to acquire, merge, manage, and analyze large volumes of structured and unstructured data ("big data"). Magellan Notebook is an example of a web-based ML modeling application that functions as an interface to an online ML computing environment provided by OpenText™ Magellan.

In some embodiments, the ML model publisher can receive an indication from a user (e.g., an application developer, a ML model developer, a data scientist, etc.) that a ML model is ready for publication. Responsive to the indication, the ML model publisher can generate a publication request form or page on a user device. The publication request form or page contains a user interface element and a single-click publication actuator. The user interface element is configured for querying an application programming interface (API) to obtain data stored in a data structure in memory.

Responsive to activation of the user interface element, the ML model publisher can access the data structure in memory. The data structure contains data used in training the ML model. This allows the ML model publisher to populate the publication request form or page with attributes required by the ML model to run, as indicated by, for instance, the column headings of a table used in training the ML model.

At this time, the user can review information on the publication request form or page and determine whether to proceed to publish the ML model by activating the single-click publication actuator (e.g., a "publish" button on the publication request form or page). Responsive to activation of the single-click publication actuator, the ML model publisher can publish the ML model to a target application (e.g., a data discovery tool) of the AI platform. In some embodiments, the publishing performed by the ML model publisher includes providing, to the target application operating in a production environment of the AI platform, a path to a repository location where the ML model is stored and information on the attributes required by the ML model to run. With the ML model publisher, no packaging of the ML model is required in publishing the ML model. Further, no additional coding is required. Once published by the ML model publisher to the target application, the ML model is available for use by a user or a group of users of the target application. Response to a request for the trained ML model, the target application can provide the path to the repository location where the ML model is stored and the information on the attributes required by the ML model to run.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
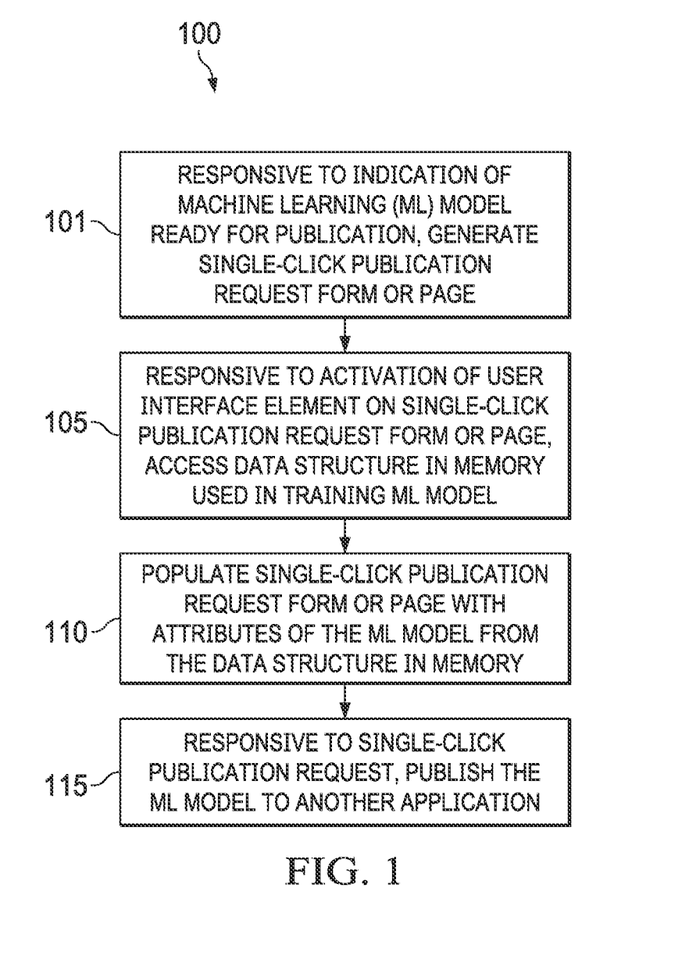
FIG. 1 depicts a flow chart illustrating an example of a ML model publishing method according to some embodiments.

FIG. 1 depicts a flow chart illustrating an example of ML model publishing method 100. In some embodiments, ML model publishing method 100 can be performed by a ML model publisher in a network computing environment. An example of network computing environment 200 is depicted in FIG. 2.

Figure 2:
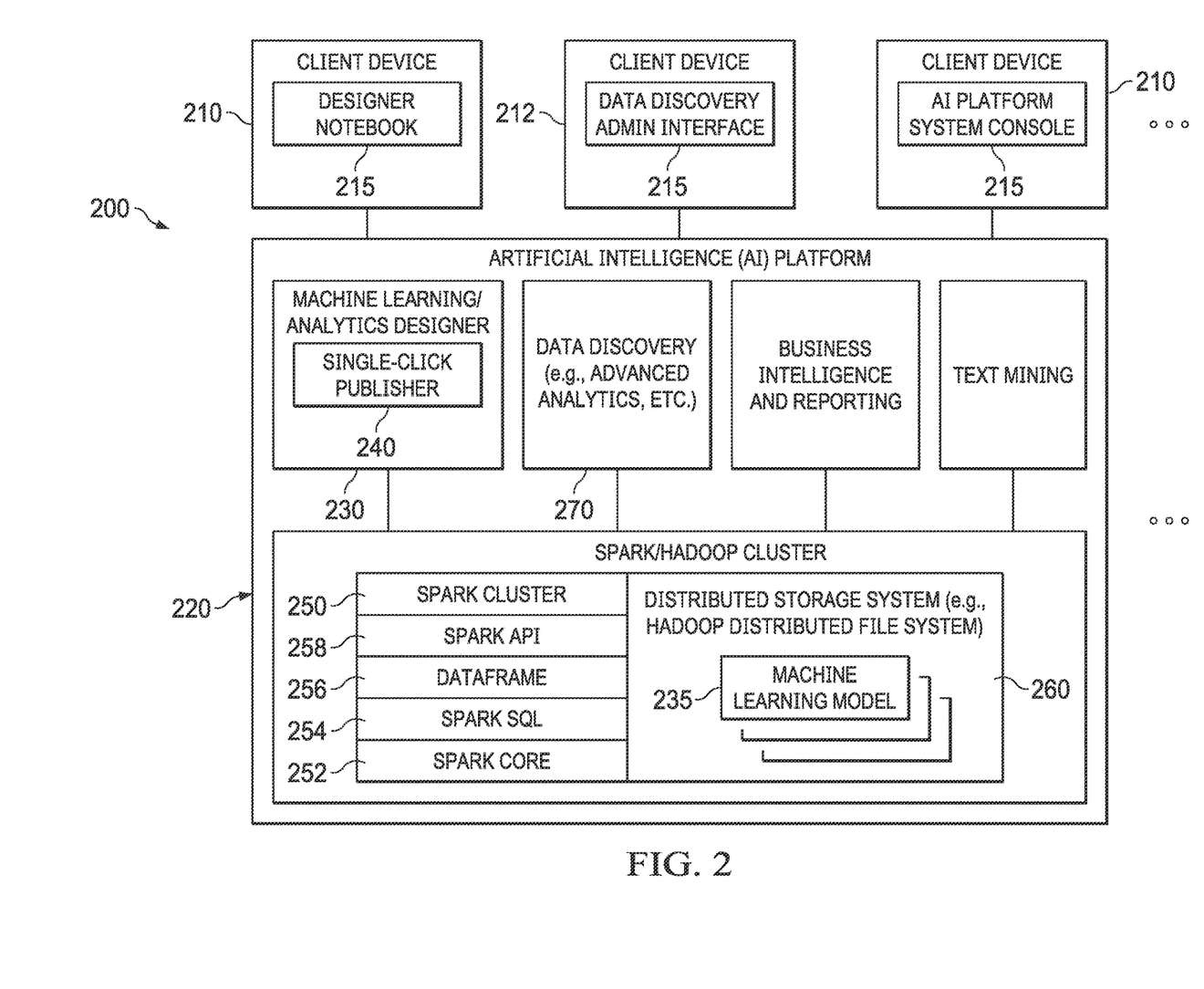
FIG. 2 depicts a diagrammatic representation of an example network computing environment where embodiments of a ML model publisher disclosed herein can be implemented.

In the example of FIG. 2, the ML model publisher (e.g., single-click ML model publisher or single-click publisher 240) can run within or be called by a ML modeling application (e.g., ML/Analytics Designer 230). The ML modeling application can be part of an AI platform (e.g., AI platform 220) such as OpenText™ Magellan and has a web-based interface or frontend application (e.g., Designer Notebook 215) that can be accessed by a user (e.g., an application developer, a ML model developer, a data scientist, etc.) on a user device (e.g., client device 210) over a network (which, although not shown in FIG. 2, can include the Internet and any appropriate private/public networks that enable the user device and the AI platform to communicate with each other). All or a portion of AI platform 220 can be hosted in a cloud computing environment. Network computing environment 200 is further described below.

The ML model publisher can be implemented in many ways. For example, the ML model publisher can be integrated as a utility or extension of the ML modeling application or embedded in the code of the ML modeling application. At the frontend, a user can access the functionality of the ML model publisher through a user interface of the ML modeling application. As another example, the functionality of the ML model publisher can be implemented at least in part (e.g., step 101) on the client side as part of the frontend application.

Figure 3:
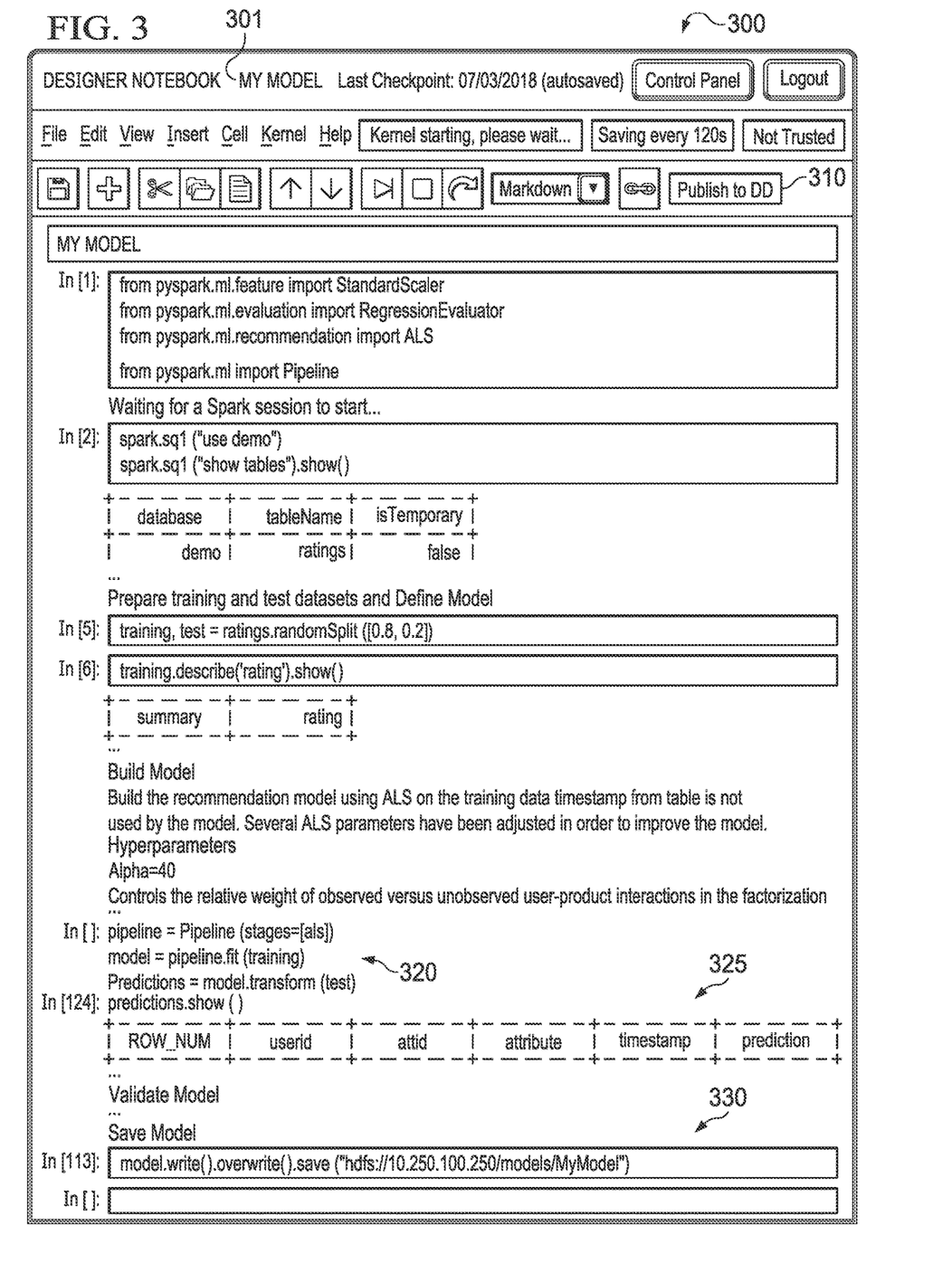
FIG. 3 depicts a diagrammatic representation of a screenshot showing a web-based user interface of a ML modeling application according to some embodiments.

In some embodiments, the ML model publisher can receive (e.g., through a user interface of the ML modeling application), an indication from a user that a ML model is ready for publication. FIG. 3 depicts a diagrammatic representation of a screenshot showing a web-based user interface (e.g., Designer Notebook 300) of a server-hosted ML modeling application according to some embodiments. In this example, a ML model developer has built, trained, and tested a ML model (e.g., My Model 301) and is ready to publish the ML model. In the example shown in FIG. 3, the web-based user interface contains a user interface element (e.g., ML model publisher activator or button 310) for invoking or activating the ML model publisher. Activation of this particular user interface element indicates to (or instructs) the ML model publisher that a ML model is ready for publication.

Figure 4:
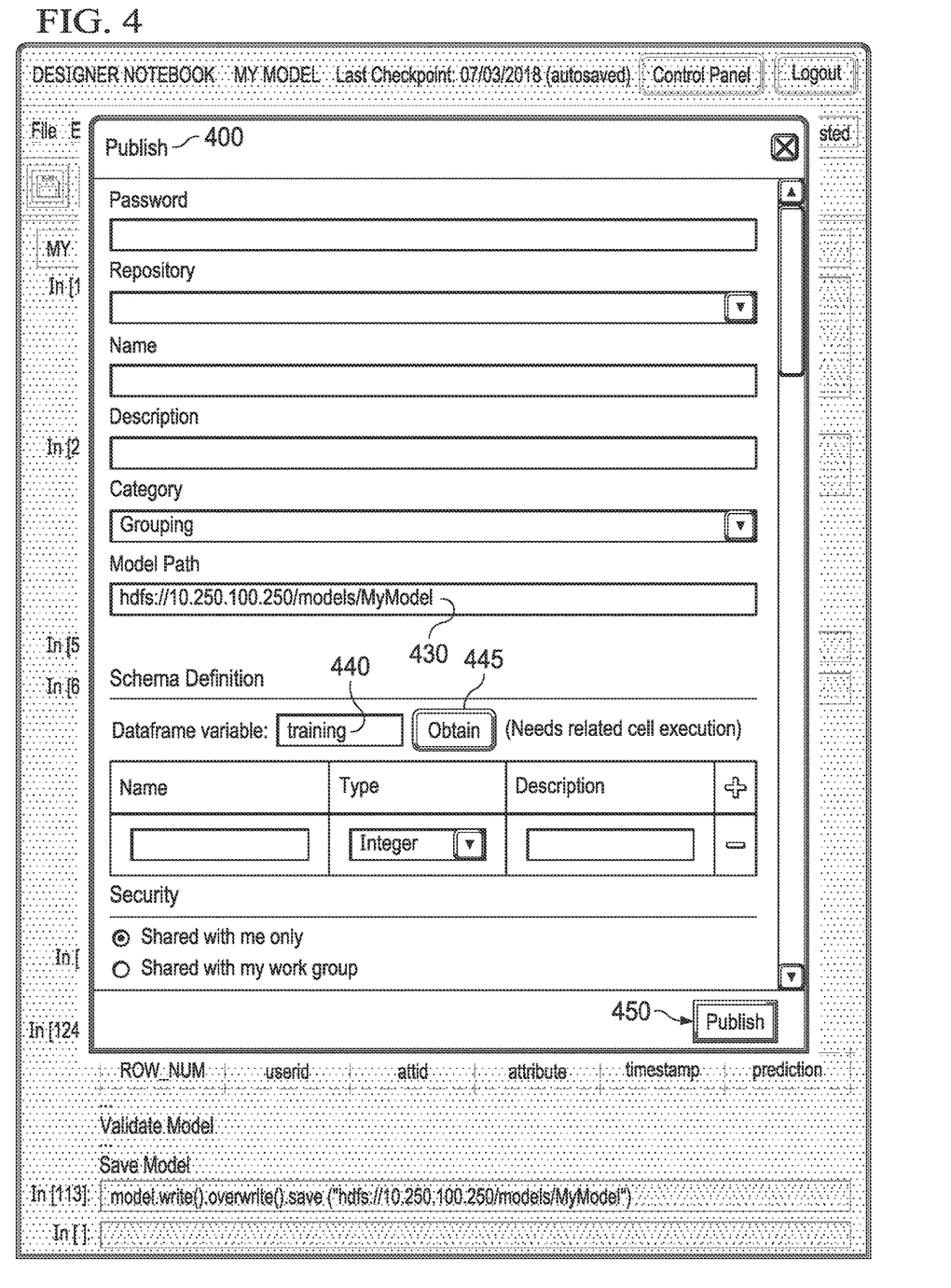
FIG. 4 depicts a diagrammatic representation of a screenshot showing a ML model publisher interface generated by a ML model publisher according to some embodiments.

Responsive to the indication, the ML model publisher can generate a publication request form or page (e.g., publication request form or page 400 shown in FIG. 4) on the user device (101). In the example of FIG. 4, publication request form or page 400 contains a user interface element (e.g., "obtain" button 445) and a single-click publication actuator (e.g., "publish" button 450). Publication request form or page 400 is described in more details below.

In some embodiments, responsive to activation of the user interface element displayed on the publication request form or page, the ML model publisher is operable to access a data structure (e.g., a table) in memory (105). The data structure is used in training the ML model. Thus, it contains attributes required by the ML model to run. By accessing such a data structure, the ML model publisher can obtain the attributes needed to run the ML model.

In some embodiments, the ML model publisher is operable to populate the publication request form or page with the attributes that it has obtained from the data structure in memory (110). As illustrated in FIG. 4, user interface element 445 is part of a schema definition section of publication request form or page 400. Upon the user selecting obtain function or button 445, the ML model publisher is operable to access a two-dimensional labeled data structure with columns of potentially different types of data (e.g., data structure 325) and automatically fill out the schema definition section of publication request form or page 400 with the attributes that it has obtained from the data structure. This process is further described below.

In some embodiments, responsive to the user selecting or clicking on the single-click publication actuator (e.g., "publish" button 450) of the publication request form or page, the ML model publisher is operable to publish the ML model to a target computing system such as an enterprise application running on a server computer or hosted in a cloud computing environment (e.g., Data Discovery 270 of AI platform 220). Publication of the ML model can include the ML model publisher providing, to the target computing system, a path to a repository location where the ML model is stored (e.g., model path 430) and information on the attributes required by the ML model to run (115).

The target computing system operates in a production environment. Publication of the ML model by the ML model publisher (e.g., single-click publisher 240) from the development environment (e.g., ML/Analytics Designer 230) to the production environment (e.g., Data Discovery 270) can mean that the ML model no longer resides in the development environment. Once published, the target computing system can include the ML model in its ML model library, database, or collection for use by its users. When a user of the target computing system wants to use the ML model, the target computing system can provide the path to the repository location where the ML model is stored and information on the attributes required by the ML model to run. Different users of the target computing system can use the ML model for different data discovery and/or analysis purposes.

As a non-limiting example, suppose there is a need for an enterprise to predict when a loyal customer might leave. A data scientist can get historical data on customer churning (e.g., a churn rate which measures the number of customers leaving the enterprise) in the past and also get data on current customers. The data scientist can write code to analyze the data (e.g., by comparing continuing customers versus leaving customers) to determine which customer is likely to become a churner. The data scientist can use this code to "train" a machine and create a "churn model" that can then be used to apply to real-life instances, such as in the field during a customer phone call, so that the machine can predict, while the customer is on the call, whether the customer might become a churner and, if so, what appropriate action can be taken accordingly.

The machine can "learn" based on the churn model to classify customers into "churner" or "not churner." When the data scientist is satisfied with the machine's performance, the churn model can be published (with no additional code writing by the data scientist, as described above) to the data discovery tool. The churn model then becomes available through the data discovery tool and accessible by an authorized user (e.g., another data scientist or a data analyst through data discovery administrative interface 217 running on client device 212). The user of the data discovery tool can use the churn model to determine "churners" and decisions can be made based on the predictions from the churn model (e.g., initiating a marketing campaign to try to deter churning). Through the data discovery tool, the same published churn model can be used in various practical applications. Further, the churn model can be published to multiple target computing systems. That is, the ML model publisher disclosed herein can provide one-to-many publishing of a ML model (e.g., by providing, to each of a plurality of target computing systems, a path to the repository location where the ML model is stored and the information on the attributes required to run the ML model).

The ML model publisher disclosed herein can provide many benefits. For instance, typically, a data scientist produces a ML model and hands it over to an engineering team for deployment in a production environment. However, with a ML model publisher discussed herein, there is no "code writing" necessary for the data scientist or any engineering team to push a trained ML model out to users/machines that use the model. For publication to users, the ML model publisher can provide the path to the repository location where the ML model is stored and the information on the attributes required to run the ML model directly to them through a user interface (e.g., AI platform system console 219 running on client device 214).

As described above, the ML model is designed by a data scientist using the ML modeling application. As a non-limiting example of implementation, a ML model can be built using a Spark-based ML pipeline. Apache Spark is an example of a distributed cluster-computing framework (which is represented by Spark cluster 250 in FIG. 2) and is widely used for performing large-scale data processing and ML computations. A Spark-based ML pipeline provide a uniform set of high-level APIs built on top of Dataframes that help users create and tune practical ML models.

Apache Spark's ML library MLlib is an example of a ML software library that can be integrated with an AI platform such as OpenText™ Magellan. Apache Spark's MLlib provides standardized APIs for ML algorithms. Through these APIs, a ML pipeline can chain multiple ML algorithms together to specify a ML workflow (e.g., for training or testing). Examples of ML algorithms that can be chained in a ML pipeline can include transformers and estimators. A transformer is an algorithm which can transform one Dataframe into another Dataframe. For instance, a ML model is a transformer which transforms a Dataframe with features into a Dataframe with predictions. An estimator is an algorithm which can be fitted on a Dataframe to produce a transformer. For instance, a learning algorithm is an estimator which trains on a Dataframe and produces a model. These transforms and estimators can share a common API for specifying parameters. The common API of Spark can package the ML pipelines.

In a distributed cluster-computing framework, a dataset is a distributed collection of data. A Dataframe is a two-dimensional data structure for organizing a dataset into named columns. Conceptually, a Dataframe is similar to a table in a relational database or a data frame in R/Python, but with richer optimization. As illustrated in FIG. 2, Spark ML API 258 uses Dataframe 256 from Spark SQL 254 as a ML dataset, which can hold a variety of data types (e.g., a Dataframe could have different columns storing text, feature vectors, true labels, and predictions). Spark SQL 254 is built on top of Spark Core 252. Structured data inside Spark programs can be queried using SQL or Spark API 258.

Building ML models using a Spark-based ML pipeline is known to those skilled in the art and thus is not further described herein. Details and examples of how to build Spark ML pipeline models can be found, for instance, from the Apache Software Foundation at spark.apache.org. Embodiments of the ML model publisher disclosed herein can improve and streamline how ML models are published at the end of the ML pipelines. The ML model publisher disclosed herein may be adapted to work with other ML platforms, for instance, through an abstraction layer that can interpret a model before the model is published by the ML model publisher.

In some embodiments, the repository where a trained ML model is stored is in a Hadoop distributed file system (HDFS) (e.g., Hadoop cluster 260 storing trained ML models 235). The HDFS is a distributed file system that shares some similarities with existing distributed file systems but with significant differences. When HDFS takes in data, it breaks the information down into separate blocks and distributes them to different nodes in a cluster, thus enabling highly efficient parallel processing and providing high throughput access to data across highly scalable Hadoop clusters. Further, the HDFS replicates, or copies, each piece of data multiple times and distributes the copies to individual nodes, placing at least one copy on a different server rack than the others. As the data on nodes that crash can be found elsewhere within a cluster, processing can continue while data is recovered. This makes the HDFS highly fault-tolerant. These features make the HDFS suitable for applications that have large data sets ("big data"). Information on the HDFS is also available from the Apache Software Foundation.

As illustrated in FIG. 2, HDFS 260 is accessible by Spark cluster 250. Apache Spark's ML library MLlib supports ML persistence through the Dataframe-based API, which provides functionality for saving and loading ML models. In practice, ML workflows include many stages, from feature extraction and transformation to model fitting and tuning. While MLlib provides the ML pipelines to help users constructing these workflow, it also saves and loads the entire pipelines. In the example of FIG. 2, when ML model 235 is saved in HDFS 260 (e.g., with a model name and in a specific folder), Spark generates a separate folder with all the stages defined in a workflow of a ML pipeline. This can include a full structure of the ML/Analytics Designer file (e.g., a JavaScript Object Notation (JSON) file) for ML model 235 (which is represented by My Model 301 shown in FIG. 3). The file can include each stage defined in the workflow of the ML pipeline including everything in the transformation stage and information needed during the usage of the model.

The file for ML model 235, which is persisted in HDFS 260, is not moved or duplicated. Rather, single-click publisher 240 publishes a minimal set of information needed to run ML model 235: 1) where ML model 235 is located (e.g., a specific path to ML model 235 in a repository location such as a folder in HDFS 260); and 2) what data is needed (e.g., attributes from model training) for running ML model 235 (e.g., age, occupation, income, region, gender, etc.).

In some embodiments, responsive to a user selecting or clicking the "publish" button (e.g., single-click publication actuator 450), single-click publisher 240 can publish the two pieces of information associated with ML model 235 to Data Discovery 270. The attributes can be mapped on Data Discovery 270 and shown by Data Discovery 270 when a user of Data Discovery 270 (e.g., a business user, a data analyst, etc.) wishes to use ML model 235. This is to inform the user of Data Discovery 270 what input data would be expected by ML model 235. As discussed above, the API of Spark can package the ML pipelines through which ML model 235 was trained and tested. Accordingly, there is no need for single-click publisher 240 to package anything.

Publication of ML model 235 by single-click publisher 240 to Data Discovery 270 represents a non-limiting example of how a ML model that was developed, trained and tested in a development environment provided through ML/Analytics Designer 230 can be published by single-click publisher 240 directly from within ML/Analytics Designer 230 to a target computing system or application (e.g., data discovery, BI and reporting, etc.) of the AI platform for use by users of the AI platform without a user of ML/Analytics Designer 230 having to write any line of code.

The ML model publisher (e.g., single-click publisher 240) provides an alternative to the traditional manual coding paradigm by which ML models are published and utilized. Traditionally, it is possible for a programmer to use a trained ML model directly within Spark. To do so, the programmer would need to know exactly where the trained ML model is stored (e.g., in HDFS 260) and open a Spark session to the trained ML model. During the Spark session, the programmer can push data to the ML model and investigate how the ML model responds. The programmer can write code to manually integrate the ML model with an application, for instance, by building a REST API to provide the application with the knowledge of where requisite data is persisted on a Spark/Hardoop type file system and where the ML model resides. This knowledge may include how data used by the application (e.g., application parameters, attributes, etc.) and data required by the ML model (e.g., model parameters, attributes, etc.) should be mapped. The programmer can write code to direct the application to apply/execute the ML model with the requisite data on demand or responsive to an event or a condition being met. The programmer can also write code to direct the application to save the output (e.g., a prediction) generated by the ML model in HDFS 260 and/or provide the output to another computing facility (e.g., BI and reporting, etc.).

With the ML model publisher, all of these coding steps can be eliminated and no additional REST APIs need to be built. Rather, the ML model publisher provides an easy-to-use and intuitive user interface (e.g., FIG. 4) with information needed to publish a ML model automatically or substantially automatically populated responsive to an indication that the ML model is ready for publication. Once the ML model is published by the ML model publisher to a target computing system, the ML model can be utilized and applied much like other ML models available through the target computing system.

In some embodiments, the ML model publisher can streamline the publication process and eliminate the need for manual coding at least because the ML model publisher can access an object in memory allocated (e.g., by an operating system of a server machine in Spark cluster 250) to a ML model in the development environment (e.g., through ML/Analytics Designer 230). For instance, referring to FIG. 3, when My Model 301 is open in Designer Notebook 300, many objects of My Model 301 are loaded into memory at the backend (i.e., the development environment at the server side), one of which is a Spark Dataframe (which is represented by data structure 325). This Dataframe can hold a variety of data types used by training pipeline 320 in training My Model 301. Thus, by accessing this object in the computer memory, the ML model publisher can obtain the attributes (e.g., column names, types, description) from the Dataframe that are needed to run My Model 301.

FIG. 4 shows that, in some embodiments, this memory access by the ML model publisher is triggered by the selection or activation of a user interface element (e.g., "obtain" button 445). In response, the ML model publisher is operable to take an input value ("training" is a Spark metadata) of a Dataframe variable (e.g., Dataframe variable 440) and query Spark (e.g., by making an API call to Spark API 258 with the value of Dataframe variable 440) to access the Dataframe (e.g., Dataframe 256) in memory. The input field for the Dataframe variable can be defaulted to "training" for the to-be published ML model. If the Dataframe exists in memory, the ML model publisher can get the Dataframe used in training the ML model from Spark and populate the schema definition section of publication request form or page 400 with the information (e.g., name, type, description) from the Dataframe. If the Dataframe does not exist in memory, this can mean that the ML model has not been trained. In such a case, the ML model publisher can return an error message indicating that it has not been able to obtain the columns from the Dataframe. To load the Dataframe in memory, the ML model would need to be run through a training pipeline. This can prevent publication of an untrained ML model.

In some embodiments, responsive to the selection or activation of the ML model publisher (e.g., through ML model publisher activator or button 310), the ML model publisher may examine My Model 301, extract a path to a repository location from code 330, and automatically populate an input field on publication request form or page 400 (e.g., Model Path 430 in the schema definition section of publication request form or page 400) with the extracted path. In some embodiments, a user can cut and paste the path from code 330 to Model Path 430.

In some embodiments, publication request form or page 400 can include input fields for a user to customize publication of a ML model. Examples of input fields can include "User" (not shown) of the user who is publishing the ML model, "Password," "Repository" (e.g., Spark), "Name" of the ML model (e.g., My Model), "Description" for a brief description of the model, "Category" for indicating a group for the ML model (e.g., whether the ML model is a categorical classifier, probabilistic classifier, recommender, transformer, regression, etc.), "Security" for sharing with a user group (or no one), etc.

Embodiments of a ML model publisher disclosed herein provide a new way to publish a ML model without manual coding. A user of a ML modeling application can fill out a publication request form or page generated by the ML model publisher with a minimal number of items (e.g., repository, model path, etc.) and instruct the ML model publisher to obtain needed data. When the ML model is being trained and tested, all the data points are saved in memory. Thus, the ML model publisher can obtain all the information needed from memory and populate the publication request form or page accordingly. The user can review the publication request form or page populated by the ML model publisher and instruct the ML model publisher to proceed with publication of the ML model directly from within a user interface of the ML modeling application. The ML model publisher persists the ML model in the repository as instructed through the publication request form or page and provide the path to the repository location where the ML model is stored, along with the attributes needed by the ML model, to a targeting computing system or application. In turn, the targeting computing system or application can expose (make available) the ML model through a frontend user interface or REST API. For instance, after ML model 235 is published by single-click publisher 240 directly from ML/Analytics Designer 230 (which represents a development environment) to Data Discovery 270 (which represents a production environment), a user who is authorized to use ML model 235 through Data Discovery 270 will see ML model 235 in their folder.

Figure 5:
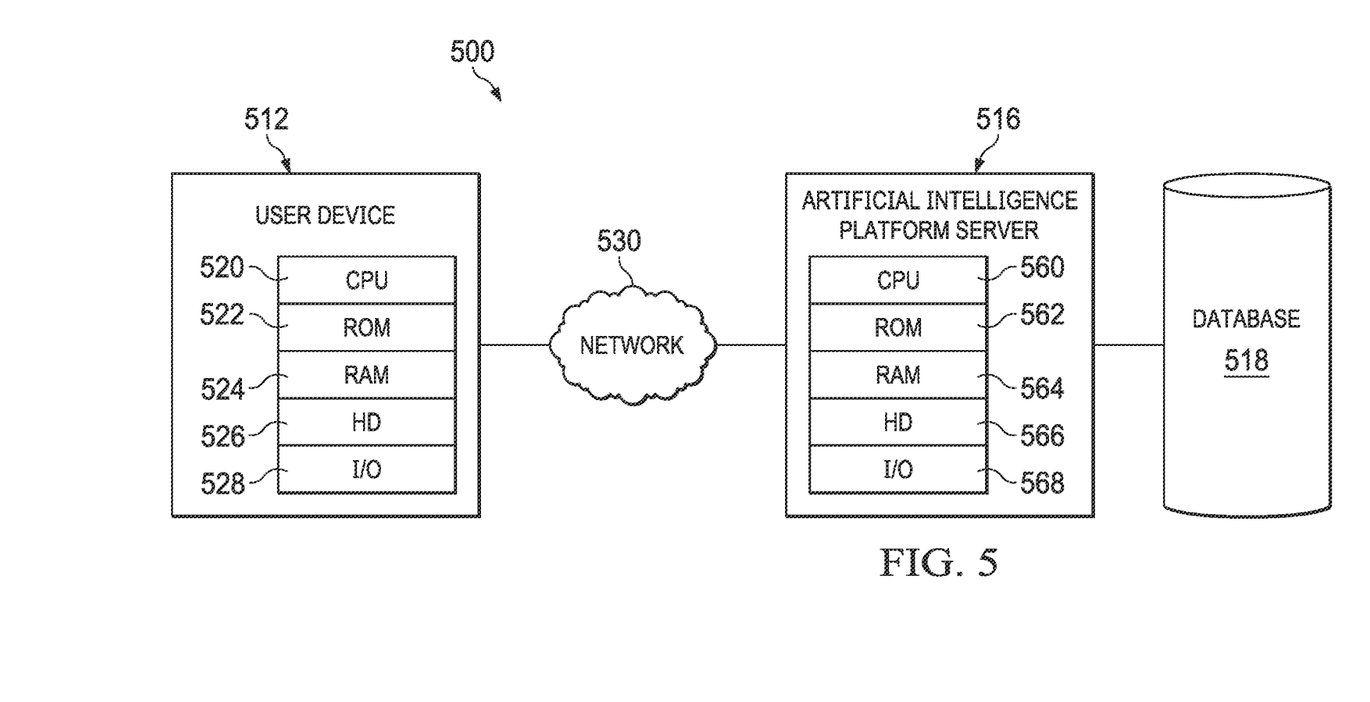
FIG. 5 depicts a diagrammatic representation of a distributed network computing environment where embodiments disclosed can be implemented.

FIG. 5 depicts a diagrammatic representation of a distributed network computing environment where embodiments disclosed can be implemented. In the example of FIG. 5, network computing environment 500 may include network 530 that can be bi-directionally coupled to user computer 512 and AI platform server 516 which, in this example, has access to ML model database 518. Network 530 may represent a combination of wired and wireless networks that network computing environment 500 may utilize for various types of network communications known to those skilled in the art.

For the purpose of illustration, a single system is shown for each of user computer 512 and AI platform server 516. However, within each of user computer 512 and AI platform server 516, a plurality of computers (not shown) may be interconnected to each other over network 530. For example, a plurality of user computers may be communicatively connected over network 530 to one or more AI platform servers.

User computers 512 may include a data processing system for communicating with AI platform server 516. User computer 512 can include central processing unit ("CPU") 520, read-only memory ("ROM") 522, random access memory ("RAM") 524, hard drive ("HD") or storage memory 526, and input/output device(s) ("I/O") 528. I/O 528 can include a keyboard, monitor, printer, electronic pointing device (e.g., mouse, trackball, stylus, etc.), or the like. User computer 512 can include a desktop computer, a laptop computer, a personal digital assistant, a cellular phone, or nearly any device capable of communicating over a network. AI platform server 516 may include CPU 560, ROM 562, RAM 564, HD 566, and I/O 568. Many other alternative configurations are possible and known to skilled artisans.

Each of the computers in FIG. 5 may have more than one CPU, ROM, RAM, HD, I/O, or other hardware components. For the sake of brevity, each computer is illustrated as having one of each of the hardware components, even if more than one is used. Each of computers 512 and 516 is an example of a data processing system. ROM 522 and 562; RAM 524 and 564; HD 526 and 566; and data store 518 can include media that can be read by CPU 520 and/or 560. Therefore, these types of memories include non-transitory computer-readable storage media. These memories may be internal or external to computers 512 or 516.

Portions of the methods described herein may be implemented in suitable software code that may reside within ROM 522 or 562; RAM 524 or 564; or HD 526 or 566. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

As is known to those skilled in the art, a suitable computer system can include a CPU, a ROM, a RAM, a HD, and I/O device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method, comprising:
responsive to an indication that a machine learning (ML) model has been trained and is ready for publication, generating, by a computer, a model publication request form or window within a ML modeling application on a user device, the ML model publication request form or window containing input fields and a publication button;
accessing, by the computer, a data structure in memory, the data structure containing an attribute used in training the ML model;
populating, by the computer, the input fields of the publication request form or window with a path to a repository location where the ML model is stored and with information from the data structure describing the attribute used in training the ML model;
receiving, by the computer, an indication that the publication button has been selected for single-click publication of the ML model; and
performing, by the computer, the single-click publication of the ML model to a target computing system, including providing the target computing system with the path to the repository location where the ML model is stored and the information describing the attribute used in training the ML model.

2. The method according to claim 1, wherein the ML modeling application runs in a development environment and wherein the target system runs in a production environment.

3. The method according to claim 1, wherein the data structure comprises a table, a data frame, or a two-dimensional data structure for organizing a dataset into named columns.

4. The method according to claim 1, wherein the publication request form or window comprises a schema definition section and wherein the populating comprises automatically filing out the schema definition section with attributes from the data structure.

5. The method according to claim 1, wherein the ML model is stored in a distributed file system.

6. The method according to claim 1, wherein the single-click publication of the ML model comprises publication of a minimal set of information needed to run the ML model and wherein the minimal set of information comprises the path to where the ML model is stored in a distributed file system and what data is needed for running the ML model.

7. The method according to claim 1, wherein the target system comprises an enterprise application running on an artificial intelligence platform.

8. A system, comprising:
a processor;
a non-transitory computer-readable medium; and
instructions stored on the non-transitory computer-readable medium and translatable by the processor for:
responsive to an indication that a machine learning (ML) model has been trained and is ready for publication, generating a model publication request form or window within a ML modeling application on a user device, the ML model publication request form or window containing input fields and a publication button;
accessing a data structure in memory, the data structure containing an attribute used in training the ML model;
populating the input fields of the publication request form or window with a path to a repository location where the ML model is stored and with information from the data structure describing the attribute used in training the ML model;
receiving an indication that the publication button has been selected for single-click publication of the ML model; and
performing the single-click publication of the ML model to a target computing system, including providing the target computing system with the path to the repository location where the ML model is stored and the information describing the attribute used in training the ML model.

9. The system of claim 8, wherein the ML modeling application runs in a development environment and wherein the target system runs in a production environment.

10. The system of claim 8, wherein the data structure comprises a table, a data frame, or a two-dimensional data structure for organizing a dataset into named columns.

11. The system of claim 8, wherein the publication request form or window comprises a schema definition section and wherein the populating comprises automatically filing out the schema definition section with attributes from the data structure.

12. The system of claim 8, wherein the ML model is stored in a distributed file system.

13. The system of claim 8, wherein the single-click publication of the ML model comprises publication of a minimal set of information needed to run the ML model and wherein the minimal set of information comprises the path to where the ML model is stored in a distributed file system and what data is needed for running the ML model.

14. The system of claim 8, wherein the target system comprises an enterprise application running on an artificial intelligence platform.

15. A computer program product comprising a non-transitory computer-readable medium storing instructions translatable by a processor for:
responsive to an indication that a machine learning (ML) model has been trained and is ready for publication, generating a model publication request form or window within a ML modeling application on a user device, the ML model publication request form or window containing input fields and a publication button;
accessing a data structure in memory, the data structure containing an attribute used in training the ML model;
populating the input fields of the publication request form or window with a path to a repository location where the ML model is stored and with information from the data structure describing the attribute used in training the ML model;
receiving an indication that the publication button has been selected for single-click publication of the ML model; and
performing the single-click publication of the ML model to a target computing system, including providing the target computing system with the path to the repository location where the ML model is stored and the information describing the attribute used in training the ML model.

16. The computer program product of claim 15, wherein the ML modeling application runs in a development environment and wherein the target system runs in a production environment.

17. The computer program product of claim 15, wherein the data structure comprises a table, a data frame, or a two-dimensional data structure for organizing a dataset into named columns.

18. The computer program product of claim 15, wherein the publication request form or window comprises a schema definition section and wherein the populating comprises automatically filing out the schema definition section with attributes from the data structure.

19. The computer program product of claim 15, wherein the ML model is stored in a distributed file system.

20. The computer program product of claim 15, wherein the single-click publication of the ML model comprises publication of a minimal set of information needed to run the ML model and wherein the minimal set of information comprises the path to where the ML model is stored in a distributed file system and what data is needed for running the ML model.

* * * * *